(12) United States Patent
Kawano

(10) Patent No.: US 10,074,366 B2
(45) Date of Patent: Sep. 11, 2018

(54) INFORMATION PROCESSING DEVICE, INFORMATION PROCESSING METHOD, AND PROGRAM

(71) Applicant: SONY CORPORATION, Tokyo (JP)

(72) Inventor: Shinichi Kawano, Tokyo (JP)

(73) Assignee: SONY CORPORATION, Tokyo (JP)

( * ) Notice: Subject to any disclaimer, the term of this patent is extended or adjusted under 35 U.S.C. 154(b) by 40 days.

(21) Appl. No.: 15/120,371

(22) PCT Filed: Jan. 21, 2015

(86) PCT No.: PCT/JP2015/051570
§ 371 (c)(1),
(2) Date: Aug. 19, 2016

(87) PCT Pub. No.: WO2015/156011
PCT Pub. Date: Oct. 15, 2015

(65) Prior Publication Data
US 2017/0069319 A1    Mar. 9, 2017

(30) Foreign Application Priority Data

Apr. 8, 2014  (JP) .................................. 2014-079310

(51) Int. Cl.
| | |
|---|---|
| G10L 15/26 | (2006.01) |
| G10L 15/20 | (2006.01) |
| G10L 15/00 | (2013.01) |
| G10L 15/22 | (2006.01) |

(52) U.S. Cl.
CPC .............. *G10L 15/22* (2013.01); *G10L 15/26* (2013.01); *G10L 2015/221* (2013.01)

(58) Field of Classification Search
None
See application file for complete search history.

(56) References Cited

U.S. PATENT DOCUMENTS

| | | | | |
|---|---|---|---|---|
| 9,042,867 | B2* | 5/2015 | Gomar | H04W 12/06 455/411 |
| 9,456,074 | B2* | 9/2016 | Kim | G10L 15/26 |
| 9,471,274 | B2* | 10/2016 | Kim | G06F 17/21 |
| 9,507,774 | B2* | 11/2016 | Furihata | G06F 17/289 |
| 9,710,224 | B2* | 7/2017 | Kim | G06F 17/21 |
| 2014/0120987 | A1* | 5/2014 | Kim | G06F 17/21 455/563 |

(Continued)

*Primary Examiner* — Satwant Singh
(74) *Attorney, Agent, or Firm* — Paratus Law Group, PLLC

(57) ABSTRACT

There is provided an information processing device that leads the user to a state of being able to utter with a voice that is easy to voice-recognize in performing voice input, the information processing device including a processing unit configured to acquire a text content as an analysis result of an inputted voice and cause a display unit to display the text content. The processing unit acquires a first text content obtained by receiving and analyzing a first voice input and causes the display unit to display the first text content, acquires a second text content as an analysis result of a second voice input received in a state where the first text content is displayed and causes the display unit to display the second text content, and settles the second text content as an input text in accordance with an operation by a user or a prescribed condition.

11 Claims, 17 Drawing Sheets

(56) References Cited

U.S. PATENT DOCUMENTS

| | | | | |
|---|---|---|---|---|
| 2014/0163983 A1* | 6/2014 | Kim | ............ | G10L 15/26 |
| | | | | 704/235 |
| 2015/0326571 A1* | 11/2015 | Gomar | ............ | H04W 12/06 |
| | | | | 726/6 |
| 2017/0206914 A1* | 7/2017 | Engelke | ............ | G10L 21/10 |
| 2017/0263249 A1* | 9/2017 | Akbacak | ............ | G10L 15/22 |

\* cited by examiner

FIG.4

FIRST INPUT: asu, ibento, ikenai, Shibuya, 15-ji kara no yotei, 16-ji kara, Shinagawa, shikyu, jikken
(tomorrow, event, can't go, Shibuya, the plan starting from 15 o'clock, from 16 o'clock, Shinagawa, urgently, an experiment)

SECOND INPUT: Asu Shinagawa de 16-ji kara jikken surukoto ni natta node, 15-ji kara no yotei ni ikenai yo
(It has been decided that tomorrow I do an experiment at Shinagawa from 16 o'clock, so I can't go to the plan starting from 15 o'clock)

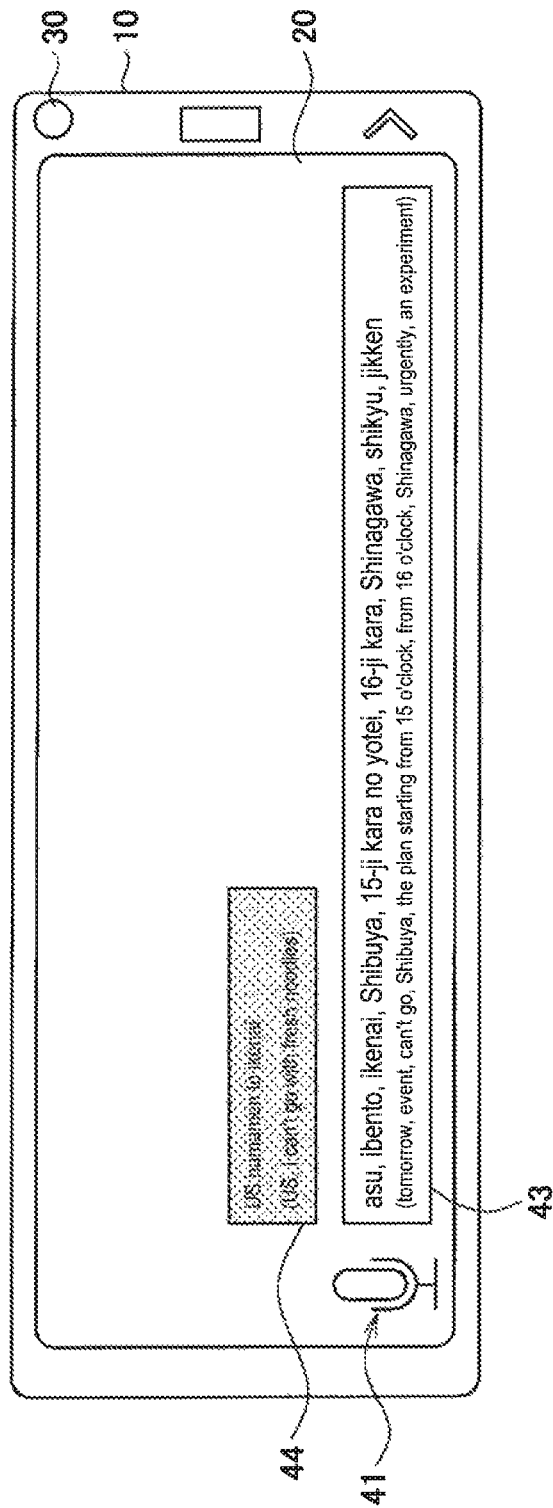

FIRST INPUT: tomorrow   scheduled meeting of 3 pm   experiments from 4 pm   at Shinagawa   I can't go SECOND INPUT: I don't think I can go scheduled meeting of 3 pm because I have a plan to experiments from 4 pm at Shinagawa tomorrow.

FIG.16
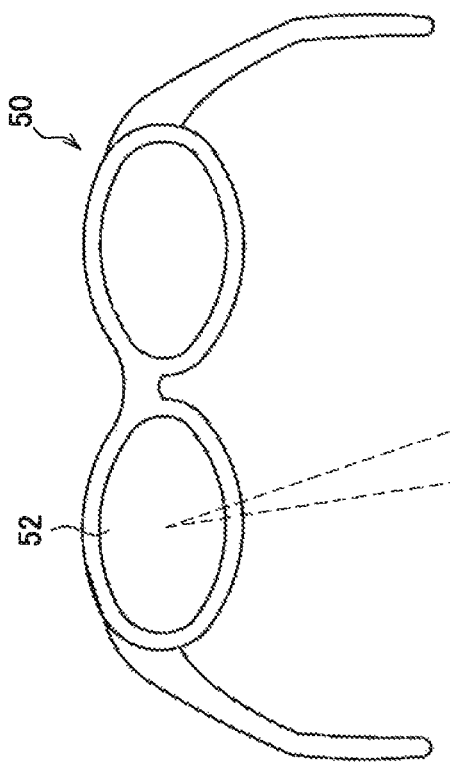
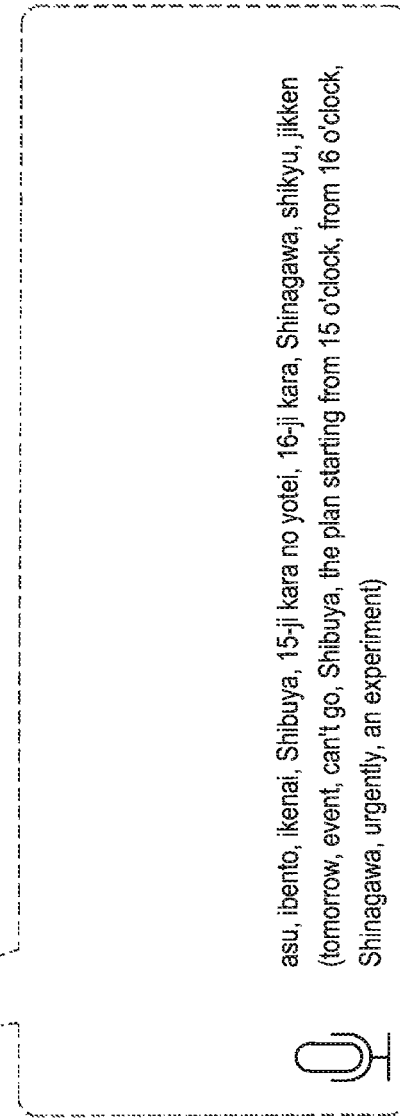

INFORMATION PROCESSING DEVICE, INFORMATION PROCESSING METHOD, AND PROGRAM

CROSS REFERENCE TO PRIOR APPLICATION

This application is a National Stage Patent Application of PCT International Patent Application No. PCT/JP2015/051570 (filed on Jan. 21, 2015) under 35 U.S.C. § 371, which claims priority to Japanese Patent Application No. 2014-079310 (filed on Apr. 8, 2014), which are all hereby incorporated by reference in their entirety.

TECHNICAL FIELD

The present disclosure relates to an information processing device, an information processing method, and a program.

BACKGROUND ART

It is difficult to organize the entire content to be voice-inputted in the brain in advance and make the utterance perfect. Even in the consciousness of voice input, the utterance tends to be made with a voice that is highly likely to fail in voice recognition during the voice input. For example, when an utterance is made using hesitations, slips of the tongue, unnecessary words inserted unconsciously, words that the voice recognition is weak in and that tend to fail in recognition, etc., such as "uh, er" and "uh-huh" it is highly likely that the voice recognition will fail.

Thus, it is difficult to acquire an intended text from an inputted voice, and hence voice recognition technology to enhance the accuracy of the text acquired from a voice is under continues investigation (e.g. Patent Literature 1 etc.).

CITATION LIST

Patent Literature

Patent Literature 1: JP 2006-146008A

SUMMARY OF INVENTION

Technical Problem

In many conventional voice recognition systems, "Please speak" is displayed on the UI during utterance. However, even when such a display is presented, a condition where the user can make an utterance that is easy to voice-recognize is not obtained. In a state where there is a manuscript of the content of speech, the user can speak fluently; but in a state where there is no manuscript at hand, it is usually difficult to speak fluently, and there is a strong tendency to utter a voice like the above which is likely to fail in voice recognition.

When an utterance is made with a voice that is likely to fail in voice recognition, the voice recognition replies an unexpected result in many cases. Consequently, time and effort for revision arises and thus the load on the user is increased, or it becomes difficult to maintain the user's motivation to use voice input. Furthermore, in terms of human characteristics, it is very difficult to utter a composition with a certain length or more in one action, that is, utter with such a composition in mind.

Thus, it has been desired to, in performing voice input, lead the user to a state of being able to utter with a voice that is easy to voice-recognize

Solution to Problem

According to the present disclosure, there is provided an information processing device including a processing unit configured to acquire a text content as an analysis result of an inputted voice and cause a display unit to display the text content. The processing unit acquires a first text content obtained by receiving and analyzing a first voice input and causes the display unit to display the first text content, acquires a second text content as an analysis result of a second voice input received in a state where the first text content is displayed and causes the display unit to display the second text content, and settles the second text content as an input text in accordance with an operation by a user or a prescribed condition.

According to the present disclosure, there is provided an information processing method including acquiring a first text content as an analysis result of a first voice input and causing a display unit to display the first text content, acquiring a second text content as an analysis result of a second voice input received in a state where the first text content is displayed and causing the display unit to display the second text content, and settling the second text content as an input text in accordance with an operation by a user or a prescribed condition.

According to the present disclosure, there is provided a program for causing a computer to execute processing including acquiring a first text content as an analysis result of a first voice input and causing a display unit to display the first text content, acquiring a second text content as an analysis result of a second voice input received in a state where the first text content is displayed and causing the display unit to display the second text content, and settling the second text content as an input text in accordance with an operation by a user or a prescribed condition.

According to the present disclosure, the analysis result of a voice, input is caused to be text-displayed so as to be utilized in the next voice input; thereby, the user can be led to a state of being able to utter with a voice that is easy to voice-recognize, and the voice input can be caused to be finally settled as the input text.

Advantageous Effects of Invention

As described above, according to the present disclosure, in performing voice input, the user can be led to a state of being able to utter with a voice that is easy to voice-recognize. Note that the effects described above are not necessarily limited, and along with or instead of the effects, any effect that is desired to be introduced in the present specification or other effects that can be expected from the present specification may be exhibited.

BRIEF DESCRIPTION OF DRAWINGS

FIG. 4 is an illustration diagram showing an example of the voice input content.

FIG. 5 is an illustration diagram showing an example of the state where the text content of a first input is displayed in a first text display region.

FIG. 16 is an illustration diagram showing an example of the display of a text content on a display unit of a glass-wearable terminal.

DESCRIPTION OF EMBODIMENT(S)

Figure 1:
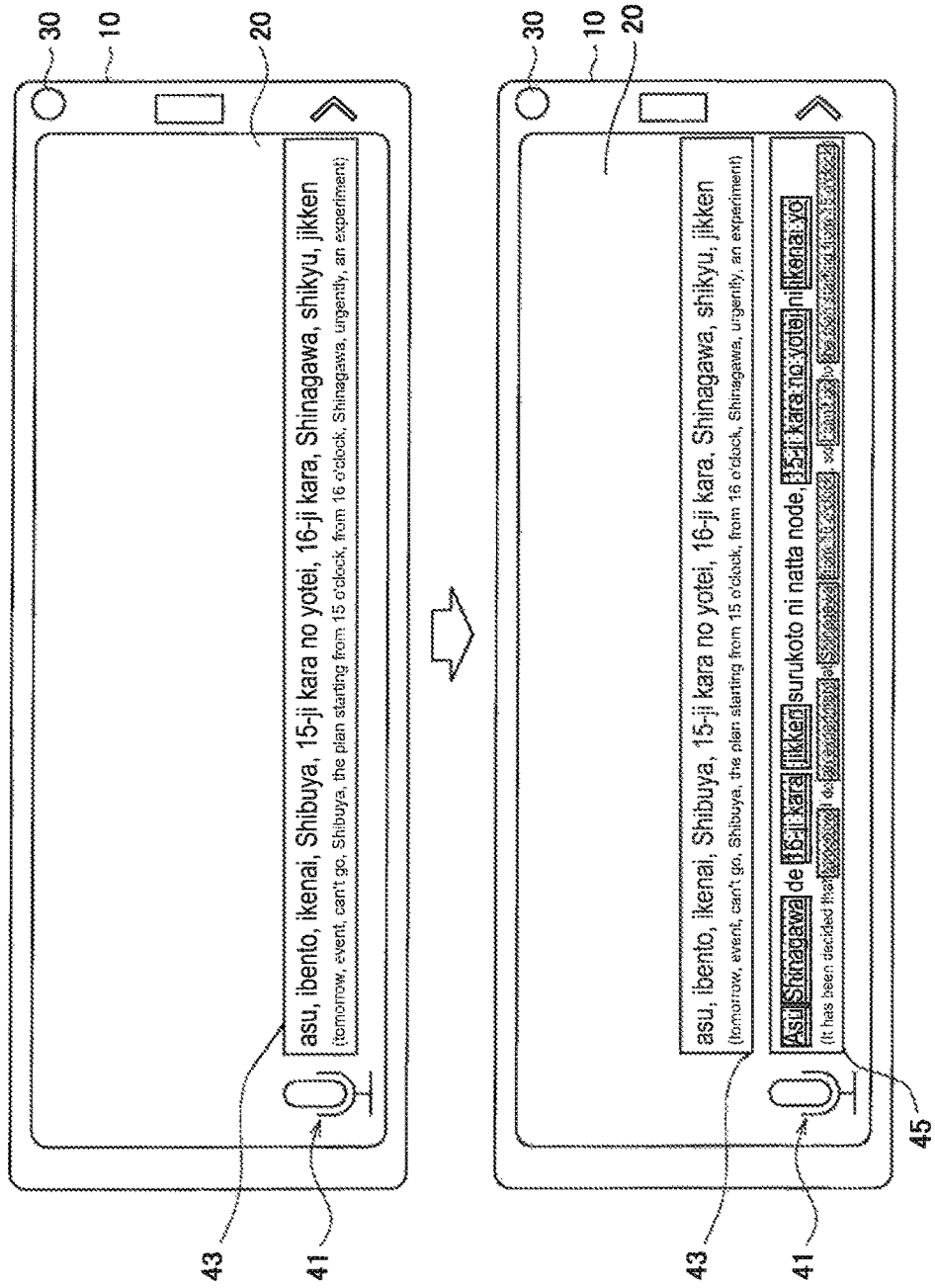
FIG. 1 is an illustration diagram showing an example of the display during a voice input according to an embodiment of the present disclosure.

Hereinafter, (a) preferred embodiment(s) of the present disclosure will be described in detail with reference to the appended drawings. In this specification and the drawings, elements that have substantially the same function and structure are denoted with the same reference signs, and repeated explanation is omitted.

The description is given in the following order.
1. Overview of voice input
2. Configuration of the information processing device
3. Voice input processing
4. Examples of the display of a text content during voice input
4.1. Examples of the voice input in Japanese
4.2. Examples of the voice input in English
4.3. Examples of the display of a text content in a glass-wearable terminal
5. Examples of the hardware configuration
6. Conclusions

1. Overview of Voice Input

First, an overview of the display processing during voice input by an information processing device according to an embodiment of the present disclosure is described with reference to FIG. 1. FIG. 1 is an illustration diagram showing an example of the display during a voice input according to the embodiment.

During a voice input by a user, the information processing device according to the embodiment displays the result of analysis of the inputted voice, and leads the user to a state of being able to utter with a voice that is easy to voice-recognize. For example, in an information processing terminal 10 like that shown in FIG. 1, the information processing device causes a display unit 20 to display the text content of a voice acquired by a microphone 30 as the result of analysis of the voice. The result of the voice recognition of the voice inputted by the information processing device is fed back to the user; thereby, the user can find out whether the voice has been recognized in conformity with the intention or not, and can utilize the result for the next voice input.

For example, the voice input can be utilized for a draft input before the input of a composition intended to be finally inputted. First, the user conceives a composition intended to be finally inputted, and utters and voice-inputs a content serving as the main point. In this draft input, it is not necessarily needed to input a composition; and words, keywords, or the like may be inputted. When the voice input is performed, for example as shown on the upper side of FIG. 1, the result of analysis of the voice input is displayed in a first input display region 43 of the display unit 20. The display content of the first input display region 43 can be utilized as a reference for the composition the user intends to input.

Next, the user performs the next voice input while viewing the display content in the first input display region 43. At this time, the user can utter while viewing the draft input content, and can therefore utter the composition intended to be inputted more smoothly. The analysis result of this voice input is displayed in a second input display region 45, for example as shown on the lower side of FIG. 1. At this time, a display in which, of the text displayed in the second input display region 45, the same parts as the text displayed in the first input display region 43 can be identified is possible.

Thus, the analysis result of a voice input is caused to be text-displayed so as to be utilized in the next voice input, and thereby the user is led to a state of being able to utter with a voice that is easy to voice-recognize. For example, in the case where a relatively long composition such as a document or an e-mail is inputted, it is possible to voice-input a simple content first and then input a correct composition while viewing the text content of the first voice input; thus, it becomes easy to perform voice input. The configuration and function of the information processing device according to the embodiment will now be described in detail.

2. Configuration of the Information Processing Device

Figure 2:
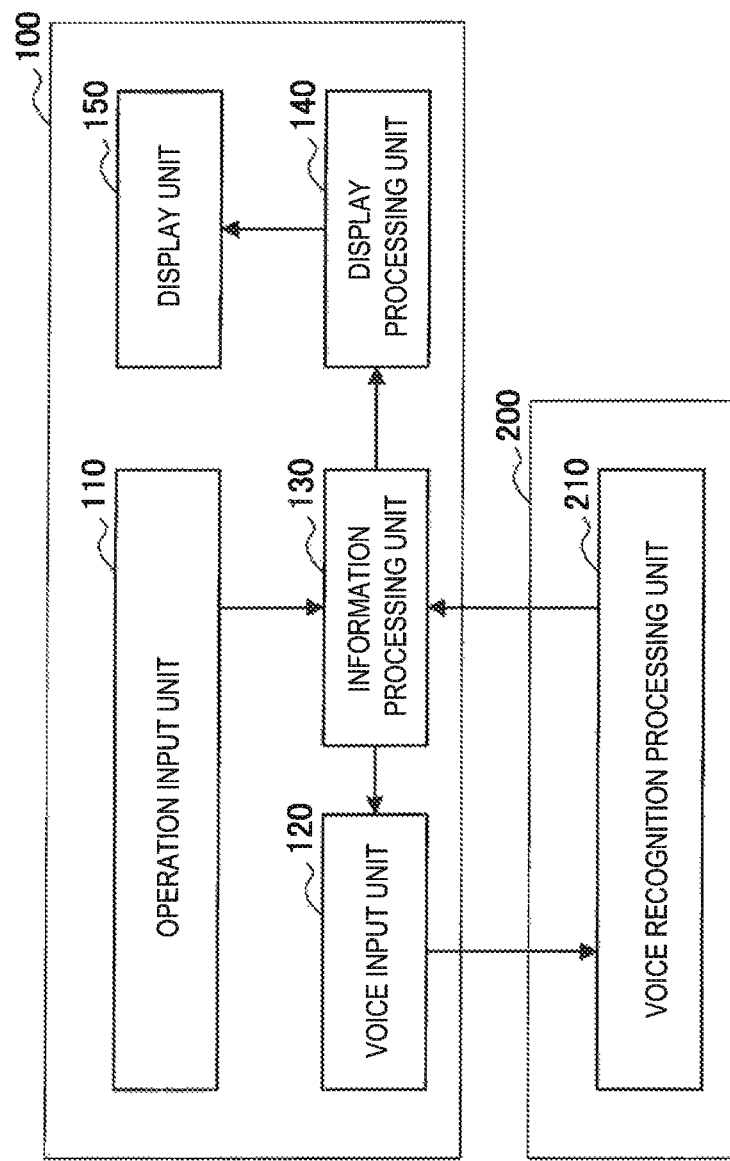
FIG. 2 is a functional block diagram showing a functional configuration of an information processing device according to the embodiment.

First, the functional configuration of an information processing device 100 according to the embodiment is described based on FIG. 2. FIG. 2 is a functional block diagram showing the functional configuration of the information processing device 100 according to the embodiment. The information processing device 100 performs the processing of receiving input information from a user and providing the analysis result of the input information to the user. The information processing device 100 is, for example, a processing device used for a smartphone, a tablet terminal, a wearable device such as a head-mounted display or a glass-wearable terminal, a television, a projector device, or the like.

The information processing device 100 according to the embodiment is composed of, as shown in FIG. 2, an operation input unit 110, a voice input unit 120, an information processing unit 130, a display processing unit 140, and a display unit 150.

The operation input unit 110 is a functional unit that receives an operation input of the device from the user. The operation input unit 110 is, for example, any of various input devices such as a touch sensor, a button, and a dial. The operation input information inputted through the operation input unit 110 is outputted to the information processing unit 130.

The voice input unit 120 is a functional unit that acquires a voice, and is, for example, a microphone or the like. The voice input unit 120 may switch between a voice acquisition state in which a voice can be acquired and a shutdown state in which a voice is not acquired on the basis of for example, the operation by the user that the information processing unit 130 has analyzed upon receiving the operation input information. Alternatively, switching to the voice acquisition state may be made in response to the startup of a certain application. The voice acquired by the voice input unit 120 is outputted to a voice processing server 200, and is subjected to voice recognition processing by a voice recognition processing unit 210.

The information processing unit 130 processes information inputted to the information processing device 100, and outputs the processed information to another functional unit. The information processing unit 130 analyzes operation input information to identify the operation that the user has performed on the information processing device 100, and causes another functional unit such as the voice input unit 120 or the display unit 150 to execute processing, for example. More specifically, for example, the information processing unit 130 switches the voice input unit 120 between the voice acquisition state and the shutdown state, and performs processing such as the editing and settlement of a text content displayed as the analysis result of a voice in accordance with the operation by the user or a prescribed condition.

Further, the information processing unit 130 performs the processing of receiving the result of voice recognition processing by the voice processing server 200 and the processing result of operation input information and determining the way of display when causing the display unit 150 to display the text content of the voice. When causing the display unit 150 to display the text content of the voice input, the information processing unit 130 may cause the text content of the voice inputted first and the text content of the voice inputted next to be displayed in parallel, for example. Further, when there is a corresponding word or composition between the text content of the voice inputted first and the text content of the voice inputted next, the information processing unit 130 may cause information indicating the corresponding relationship to be displayed.

Thus, the information processing unit 130 performs the processing described above upon receiving the result of voice recognition processing by the voice processing server 200, and then causes the display processing unit 140 to perform display processing for causing the display unit 150 to display the text content of the voice. Further, the information processing unit 130 may cause the display control unit 140 to alter the display content on the display unit 150 in accordance with the result of analysis of operation input information.

The display processing unit 140, upon receiving an input from the information processing unit 130, performs processing for causing the display unit 150 to display information. The display processing unit 140 causes the display unit 150 to display the text content of a voice input and additional information related to the text content.

The display unit 150 is a display device that displays display information from the display processing unit 140, and is, for example, a liquid crystal display, an organic EL display, or the like. The information processing device 100 may not necessarily include the display unit 150. For example, in the case of a projector device or the like, the display unit 150 may not be provided.

As shown in FIG. 2, the information processing device 100 according to the embodiment performs the voice recognition processing of a voice acquired by the voice processing server 200 connected via a network. However, the present disclosure is not limited to such an example, and the voice recognition processing unit 210 may be provided in the information processing device 100.

As the method of the voice recognition performed by the voice recognition processing unit 210 of the voice processing server 200, known technology may be used. The voice recognition processing unit 210 receives the input of a voice, and outputs a text content recognized from the voice to the information processing device 100. At this time, along with the text content, the accuracy as the voice recognition of the text content may be outputted to the information processing device 100 on the basis of a prescribed unit of text such as a word, a phrase, or a sentence. In this case, the information processing unit 130 of the information processing device 100 may show the accuracy of the text content when causing the text content to be displayed. For example, a text with low accuracy may be highlighted; thereby, the user can be notified of a content of which the voice recognition is highly likely to be incorrect, and can utilize the notification for the next voice input.

3. Voice Input Processing

Figure 3:
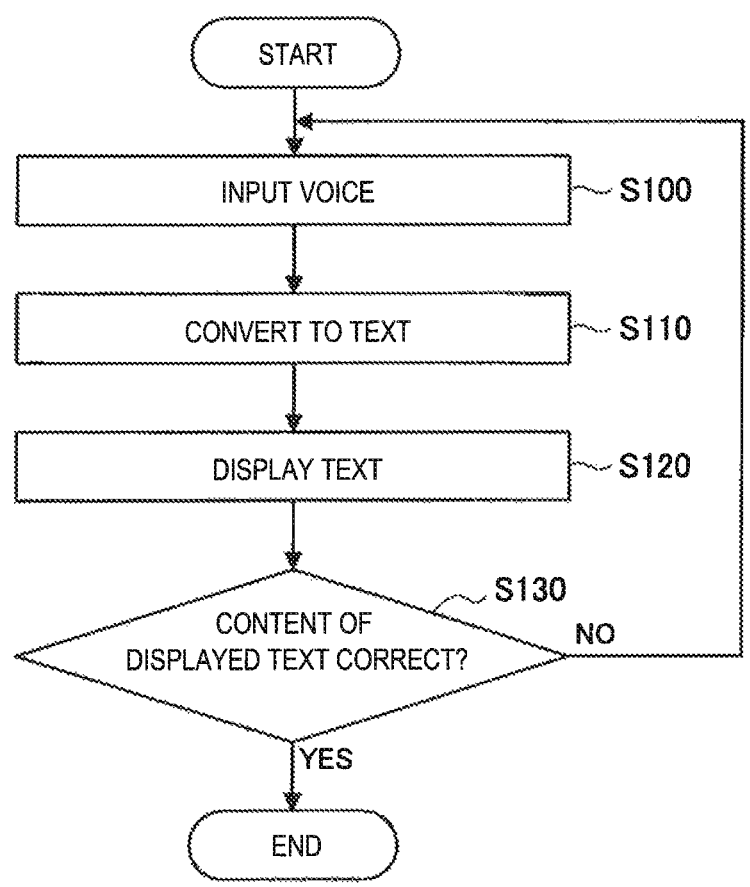
FIG. 3 is a flow chart showing an example of the voice input processing according to the embodiment.

Next, the voice input processing by the information processing device 100 according to the embodiment is described based on FIG. 3. FIG. 3 is a flow chart showing an example of the voice input processing according to the embodiment.

In the voice input processing according to the embodiment, as shown in FIG. 3, first, a voice is acquired by the voice input unit 120 (S100). On receiving the voice input, the voice input unit 120 outputs the voice to the voice processing server 200, and the voice is converted to a text by voice recognition processing (S110). The voice processing server 200 outputs a text content acquired as the analysis result of voice recognition processing to the information processing device 100.

On receiving the text content of the voice from the voice processing server 200, the information processing unit 130 causes the display unit 150 to display the text content via the display control unit 140 (S120). At this time, the information processing unit 130 may cause the display unit 150 to display the text content of the voice inputted first and the text content of the voice inputted next in parallel. Further, in the case where there is a corresponding word or composition between the text content of the voice inputted first and the text content of the voice inputted next, the information processing unit 130 may cause information indicating the corresponding relationship to be displayed. By performing such a display, it is made easy for the user to perform voice input.

When a text content is displayed on the display unit 150, for example, the user views the displayed text content of the voice to check whether the content is the content intended to be inputted or not (S130). When the text content is the intended content, for example, the displayed text content is settled and utilized as the input text. On the other hand, when the text content is not the intended content, the procedure returns to the processing of step S100, and the user inputs a voice again. At this time, the user can utter while viewing the text content obtained during the last voice input, and can therefore perform voice input more smoothly than last time.

The processing of steps S100 to S130 may be performed repeatedly until the user settles the text content in step S130, for example. Thus, the information processing device 100 according to the embodiment receives a voice input, and displays a text content recognized upon receiving the voice input on the display unit 150 to present the text content to the user; and thereby brings about a state where it is easy for the user to perform the next voice input. Thus, the user can perform a voice input with fewer errors in voice recognition.

4. Examples of the Display of a Text Content During Voice Input

Examples of the display of a text content when voice input is performed by the information processing device 100 described above will now be described based on FIG. 4 to FIG. 11. In the following, the case where the information processing device 100 is used for a character input software application that is one function of the information processing terminal 10 including the display unit 20 and the microphone 30 is described. The display unit 20 of the information processing terminal 10 is configured as a touch panel, and also has a function as the operation input unit 110.

4.1. Examples of the Voice Input in Japanese

A. First Input

First, an example of the content intended to be voice-inputted is shown in FIG. 4. In FIG. 4, a first input is words, sentences, or the like related to the composition the user intends to input finally. In the example of FIG. 4, it is assumed that words or sentences serving as a reference for inputting the composition intended to be finally inputted are inputted. A second input is, for example, the composition the user intends to input finally. The second input is voice-inputted while the text content of the first input is viewed.

That is, the first input is a draft input for inputting the composition intended to be finally inputted (hereinafter, occasionally referred to as a "rough input"), and the second input is an input that is finally performed (hereinafter, occasionally referred to as a "clean copy input"). After a rough input is performed, the information processing device 100 according to the embodiment causes the user to perform a clean copy input while viewing the text content of the rough input, and thereby makes it easy to input the content the user intends to input.

The voice input processing by the character input software application in the information processing terminal 10 is started by, for example, a touch by the user on a microphone icon 41 displayed on the display unit 20. When the touch on the microphone icon 41 is sensed, the microphone 30, which is the voice input unit 120, enters the voice acquisition state.

It is assumed that, after the microphone 30 has entered the voice acquisition state, the content of the first input of FIG. 4 is voice-inputted by the user. At this time, the information processing device 100 receives the voice input and causes the voice processing server 200 to execute voice recognition processing, and consequently acquires a text content. The information processing unit 130 of the information processing device 100 that has acquired the text content instructs the display processing unit 140 to cause the text content to be displayed in the first text display region 43, for example as shown in FIG. 5. The first input is performed as a rough input of the composition the user intends to input finally. At this time, the information processing unit 130 may cause the unit of display text of the text content in the first text display region 43 to be altered in accordance with the unit of voice-inputted text (for example, a word, a phrase, or a composition).

At this time, the information processing unit 130 may acquire, along with the text content of the first input, an intermediate result of voice recognition processing from the voice processing server 200, and may cause the content thereof to be displayed in an additional information display region 44. By displaying an intermediate result of voice recognition processing, how the uttered content is recognized can be fed back to the user, and can be used as a reference for how the utterance should be made in order to be voice-recognized correctly in the next voice input.

Figure 6:
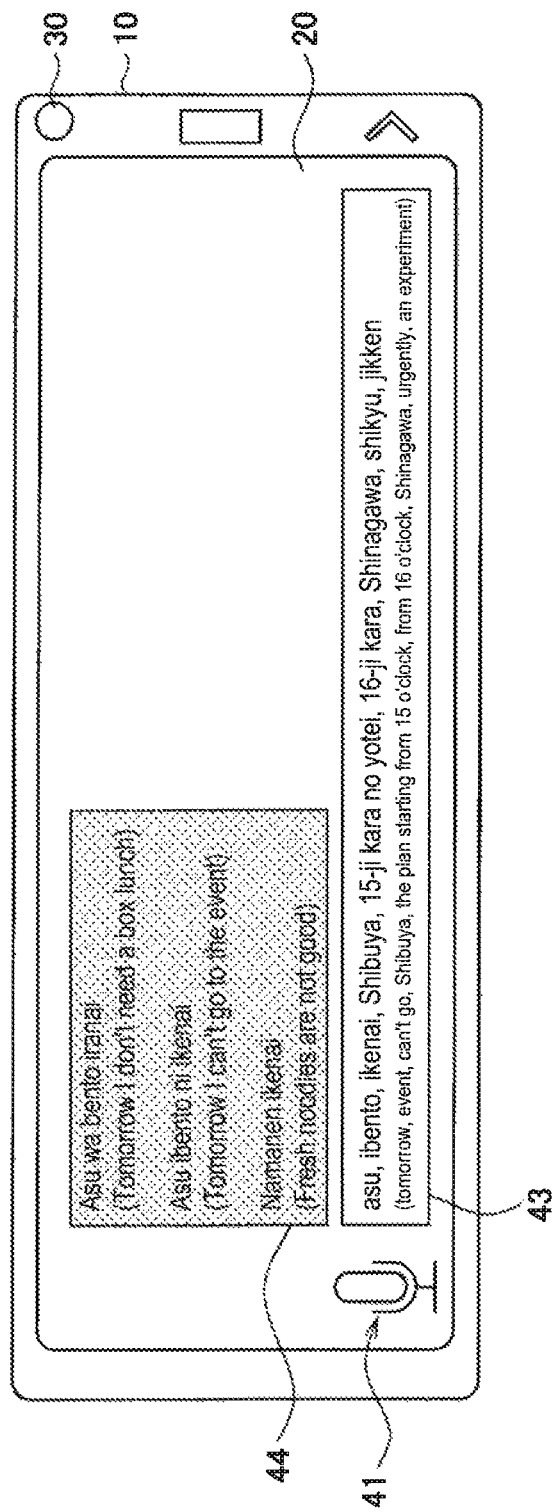
FIG. 6 is an illustration diagram showing an example of the state where text candidates are displayed along with the text content of the first input.

Further, as shown in FIG. 6, the information processing unit 130 may acquire, along with the text content of the first input, one or a plurality of text candidates recognized in voice recognition processing from the voice processing server 200, and may cause the content thereof to be displayed in the additional information display region 44. Also by displaying a text candidate of voice recognition processing, how the uttered content is recognized can be fed back to the user, and can be used as a reference for how the utterance should be made in order to be voice-recognized correctly in the next voice input.

Figure 7:
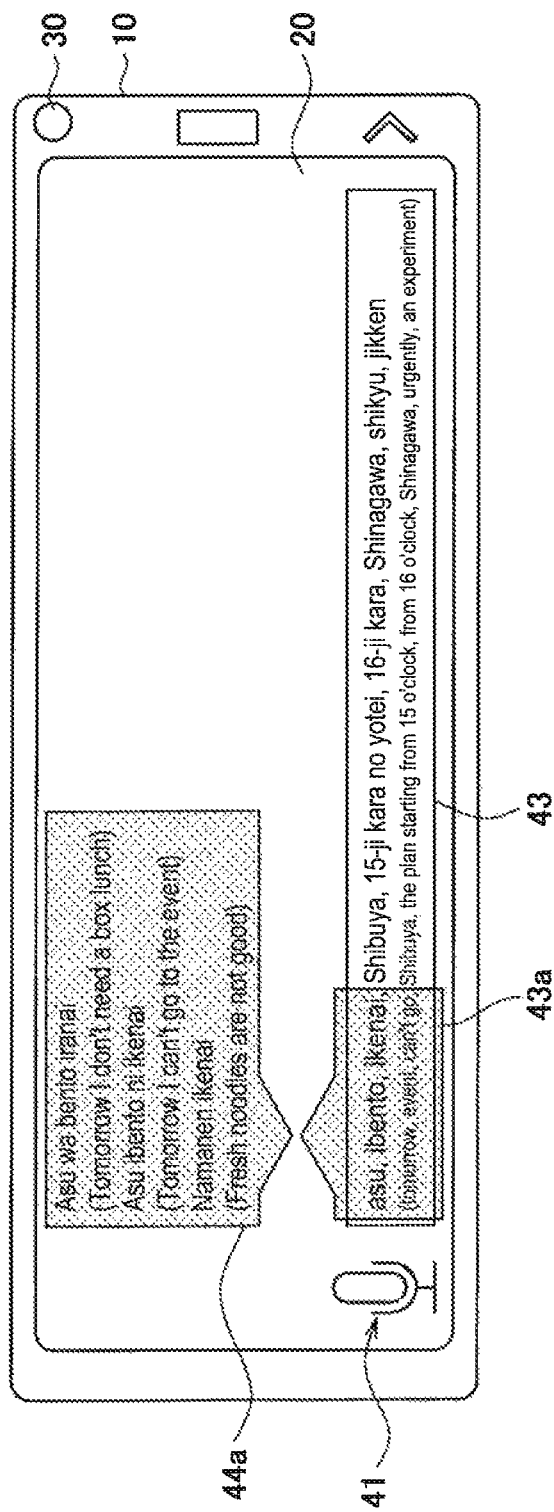
FIG. 7 is an illustration diagram showing an example of the state where the corresponding relationship between the text content of the first input and the text candidate is shown.

Further, in order to make clear the corresponding relationship between the intermediate result of voice recognition processing shown in FIG. 5 or the text candidate shown in FIG. 6 and the text content of the first input, the information processing unit 130 may show the corresponding parts by enclosing them with objects 43*a* and 44*a* like those shown in FIG. 7. Although the objects 43*a* and 44*a* of FIG. 7 are in a balloon shape, the object indicating the corresponding relationship is not limited to such an example, and the corresponding texts may be enclosed by the same kind of frame, for example. The relationship may be indicated also by showing the corresponding texts with, other than objects, the same character color or font, or by underlining them with the same line type.

The way of display of such a text content acquired as the analysis result of a voice may be established beforehand in the information processing device 100, or may be established based on the operation by the user.

B. Second Input

When the text content of the first input is displayed in the first text display region 43, the user touches the microphone icon 41 again to set the microphone 30 to the voice acquisition state. Then, the user utters the information the user intends to input finally (that is, the content of the second input of FIG. 4) while viewing the text content displayed in the first text display region 43. Like during the first input, the information processing device 100 outputs the voice to the voice processing server 200 to cause voice recognition processing to be executed, and consequently acquires a text content. The information processing unit 130 of the information processing device 100 that has acquired the text content displays the text content in the second text display region 45, for example as shown in FIG. 8.

Figure 8:
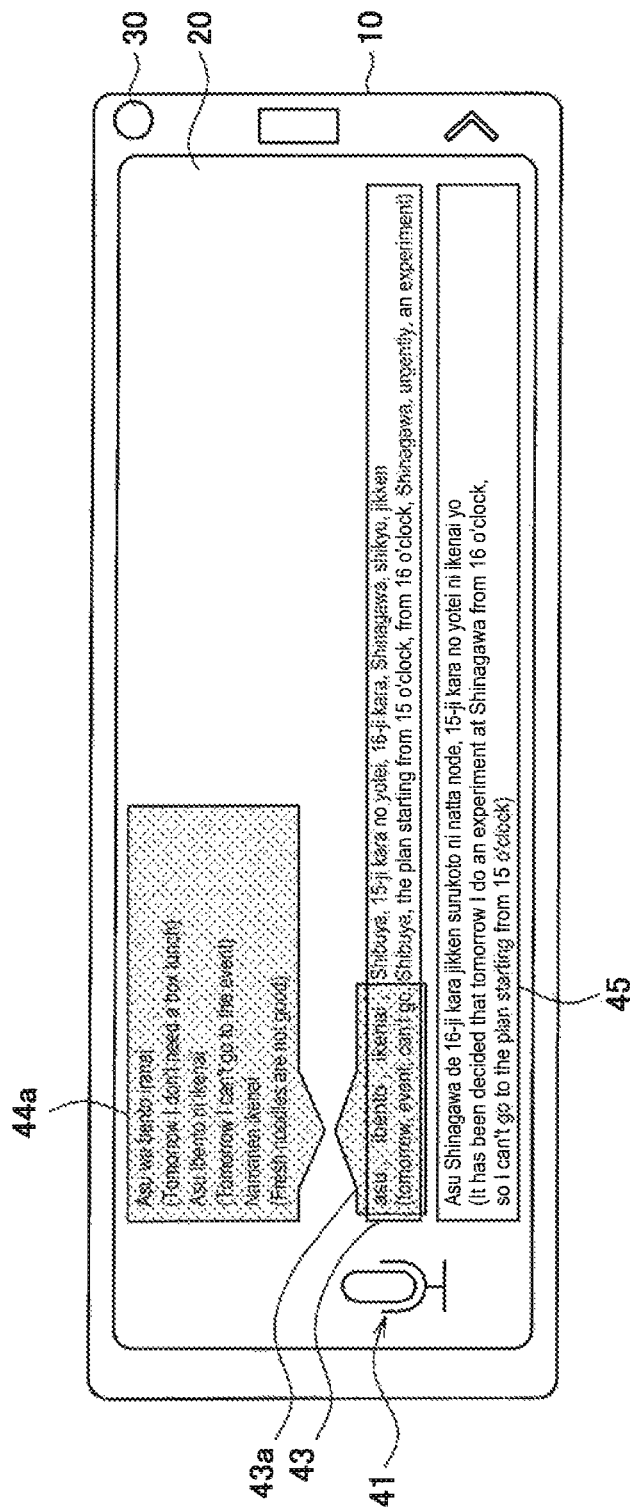
FIG. 8 is an illustration diagram showing an example of the state where the text content of a second input is displayed in a second text display region.

The second text display region 45 may be vertically juxtaposed with the first text display region 43, for example as shown in FIG. 8. By thus arranging the text display regions 43 and 45, it becomes easy to compare the text contents acquired from the voice of the first input and the voice of the second input. The arrangement of the text display regions 43 and 45 is not limited to such an example, and may be determined as appropriate in accordance with the viewability of the text, the shape of the display region of the display unit 20, etc.

Figure 9:
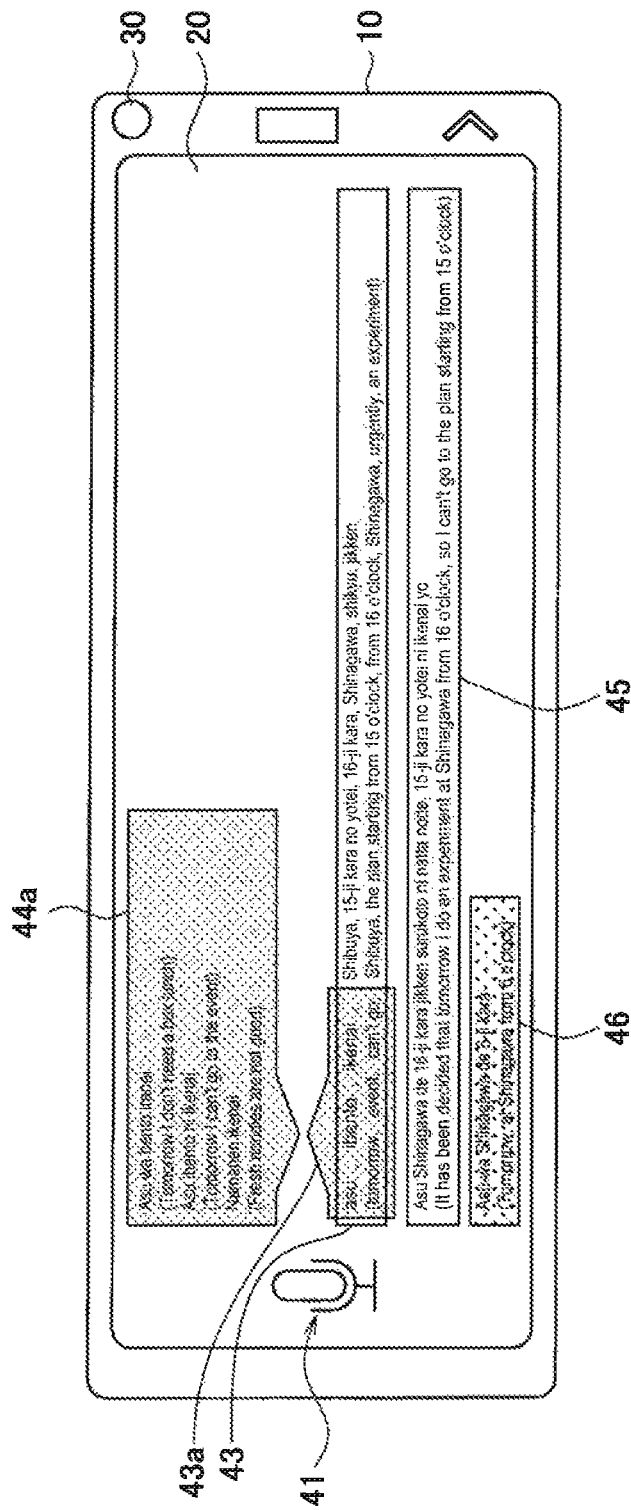
FIG. 9 is an illustration diagram showing an example of the state where text candidates are displayed along with the text content of the second input.

As shown in FIG. 9, the information processing unit 130 may acquire, along with the text content of the second input, one or a plurality of text candidates recognized in voice recognition processing from the voice processing server 200, and may cause the content thereof to be displayed in a second additional information display region 46. Also by displaying a text candidate of voice recognition processing, how the uttered content is recognized can be fed back to the user, and can be used as a reference for how the utterance should be made in order to be voice-recognized correctly in the next voice input. Like during the first input, the information processing unit 130 may acquire, along with the text content of the second input, an intermediate result of voice recognition processing, and may cause the intermediate result to be displayed.

Figure 10:
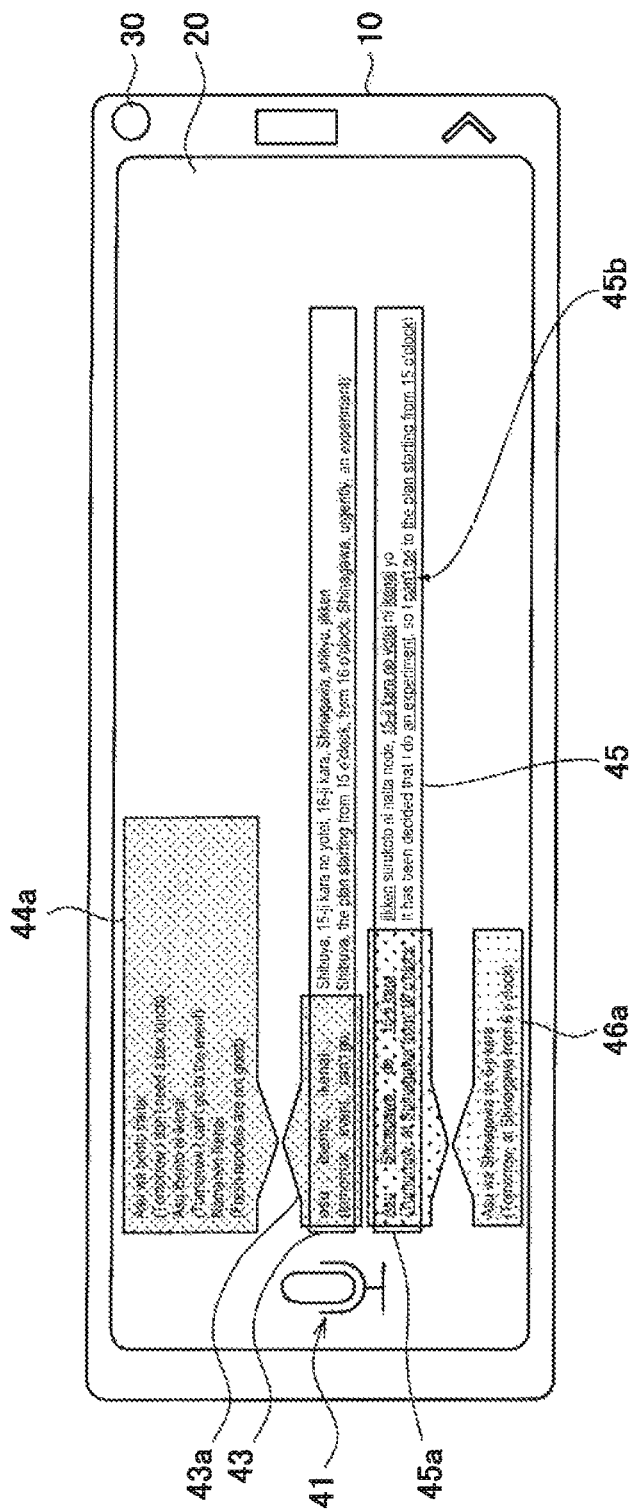
FIG. 10 is an illustration diagram showing an example of the state where the corresponding relationship between the text content of the second input and the text candidate is shown.

Further, in order to make clear the corresponding relationship between the text candidate shown in FIG. 9 and the text content of the second input, the information processing unit 130 may show the corresponding parts by enclosing them with objects 45a and 46a like those shown in FIG. 10. Also the shape of the objects 45a and 46a of FIG. 10 may be set as appropriate similarly to the objects 43a and 44a shown in FIG. 7. The relationship may be indicated also by showing the corresponding texts with, other than objects, the same character color or font, or by underlining them with the same line type.

Further, in the text content of the second text display region 45, the information processing unit 130 may notify the user of to what extent the text content of the first text display region 43 of a rough input is included. For example, in the text content of the second text display region 45, the information processing unit 130 highlights words or sentences included in the text content of the first text display region 43, and thus causes the way of display to be altered to an easy-to-understand display for the user. The highlighting of the text may be performed by, for example, a character modification such as painting over the edges of the characters, altering the character font and/or the character color, and/or underlining the characters. In FIG. 10, the characters are highlighted by drawing an underline 45b.

Thereby, the user can easily grasp to what extent the content of the first input is included in the content of the second input, and can intuitively determine whether the content of the second input is what is intended or not.

Figure 11:
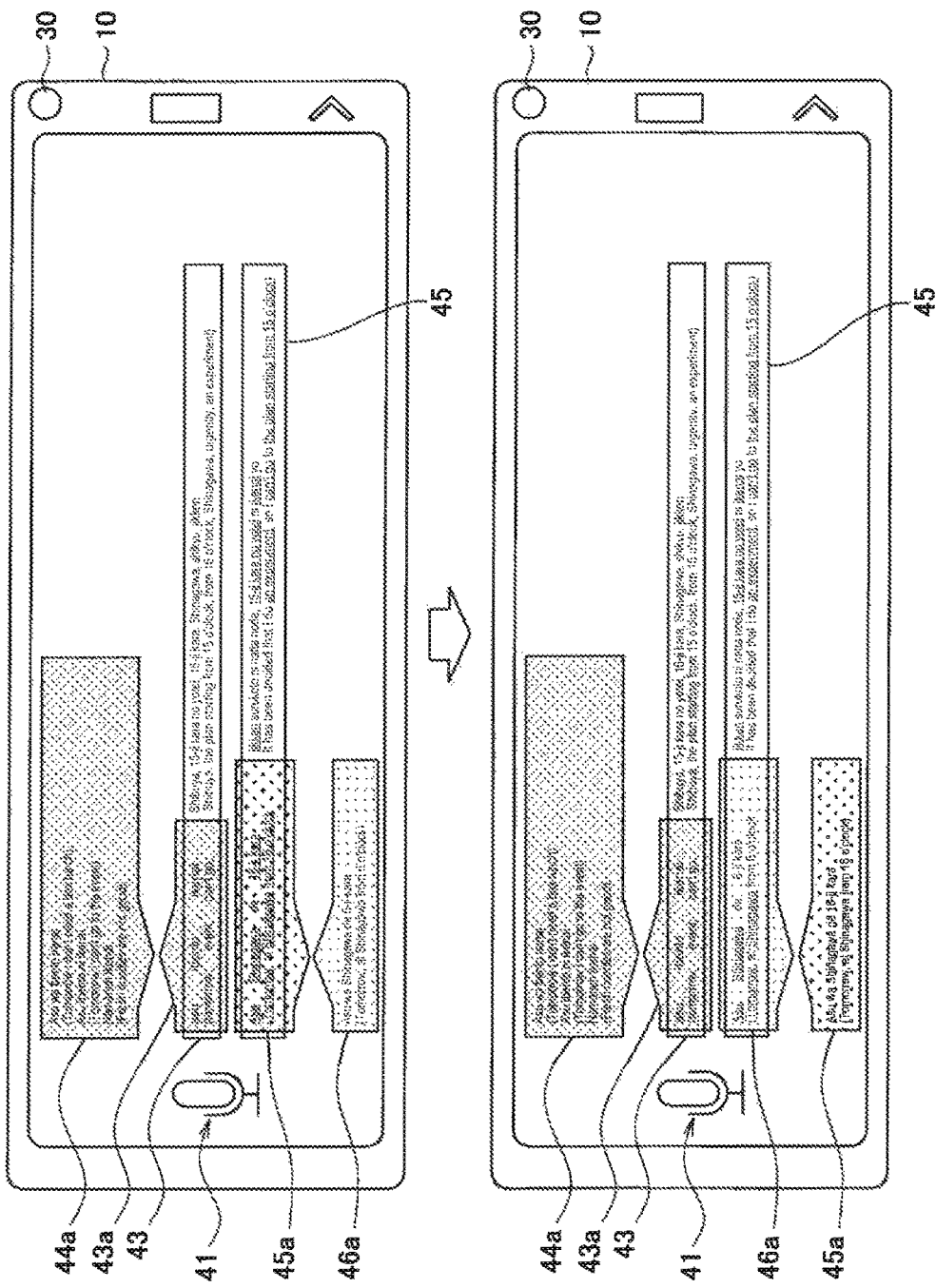
FIG. 11 is an illustration diagram showing an example of the state where the text content of the second text display region and the text candidate of a second additional information display region are exchanged.

Further, the information processing unit 130 may exchange the text content of the second text display region 45 and the text candidate of the second additional information display region 46 on the basis of the operation input by the user. For example, as shown in FIG. 11, there are a text marked with the object 45a in the second text display region 45 ("Asu Shinagawa de 6-ji kara (Tomorrow, at Shinagawa from 6 o'clock)") and a text candidate marked with the object 46a in the second additional information display region 46 ("Asu wa Shinagawa de 16-ji kara (Tomorrow, at Shinagawa from 16 o'clock)"). At this time, when it is intended to choose the content of the text candidate, the user moves the text candidate to the position of the object 45a in a state of keeping touching the object 46a displayed on the display unit 20, for example. On receiving such an operation input, the information processing unit 130 instructs the display processing unit 140 to exchange the text contents of the object 45a and the object 46a and display them. Thus, a revision can be made to obtain the intended content without performing a voice input again.

After that, when the text content of the second text display region 45 has become the content intended to be inputted, the user performs the operation input of settling the text content as the input text. In this input operation, the display unit 20 may, when it is caused to display a text content as an analysis result, be caused to display also a settlement button (not illustrated) with which the processing of settling the text content is caused to be executed, and a touch operation on the settlement button may be used as the operation of the settlement of the text content, for example.

Alternatively, when the information processing unit 130 has determined that a prescribed condition is satisfied, a text content as the analysis result of the voice inputted latest may be settled as the input text. As the prescribed condition by which the text content is caused to be settled as the input text, for example, an event in which the input of a voice command from the user, such as "Kore o nyuryoku (Input this)", is received, an event in which a nod of the user is sensed by an acceleration sensor or a gyro sensor, etc. are given. In addition, for example, an event in which a prescribed period of time has elapsed from when the text content displayed last was displayed, an event in which a viewing of a prescribed position by the user for a certain period of time or more is sensed by eye-gaze tracking, etc. are given.

On the other hand, when it is intended to input a text content different from the text content of the second text display region 45 etc., the user performs a voice input by operating the microphone icon 41 to set the microphone 30 to the voice acquisition state again. At this time, the text content of the first text display region 43 and the text content of the second text display region 45 may be kept displayed, and thereby the user can perform voice input more easily. It is not necessary to keep all the text contents for the past voice inputs displayed, and it is also possible to cause only the text contents of the latest n voice inputs to be displayed, for example.

The settled input text may be caused to be outputted as the input text to various applications. As the various applications, for example, an e-mail, a messenger, a social media service (SNS) application, a calendar, a schedule management application, a notebook application, etc. are given. That is, the input text inputted by a voice is utilized as a sentence or a memorandum of an e-mail or a messenger. When the voice input processing according to the embodiment is employed, a text content as the analysis result of a voice is displayed, and the user can perform the next utterance while viewing the text content; thus, the user can perform text input more easily when inputting a relatively long composition.

Hereinabove, examples of the voice input processing by the information processing device 100 according to the embodiment are described. In the above description, the operation input that the user performs through the operation input unit 110, such as setting the microphone 30 to the voice acquisition state or settling the text content, varies depending on the information processing terminal 10. For example, in the case of an information processing terminal 10 equipped with a touch sensor, such as a smartphone or a tablet terminal, the operation input may be performed by touching the touch sensor. Furthermore, in the case of a wearable device, such as a head-mounted display or a glass-wearable terminal, an operation input in which the user selects a display content by the user's line of vision, an operation input through an operating part provided in the wearable device, etc. may be used. Also a voice input operation such as "Ue (Up)" or "Shita (Down)" is possible. In addition, a gesture input in which a display content is selected by a gesture of the user, an operation input performed by sensing a movement of the head, for example facing to the right or facing to the left, by utilizing the sensing result of an acceleration sensor, etc. may be used.

4.2. Examples of the Voice Input in English

Figure 12:
FIG. 12 is an illustration diagram showing an example of the voice input content in English.

The examples of the voice input processing described above can be performed similarly regardless of the language. For example, as shown in FIG. 12, even when the language of voice input is English, the first input may be performed as the rough input and the second input may be performed as the clean copy input in a similar manner to the above.

Figure 13:
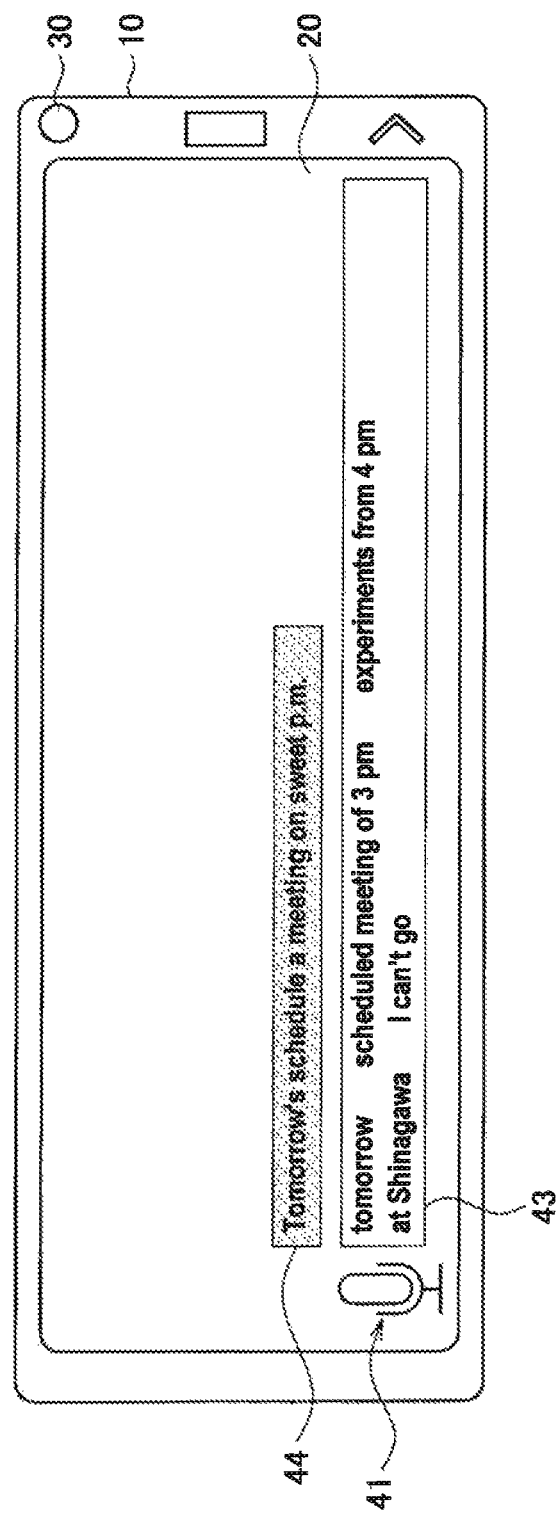
FIG. 13 is an illustration diagram showing an example of the state where the text content of a first input is displayed in the first text display region during a voice input in English.
Figure 14:
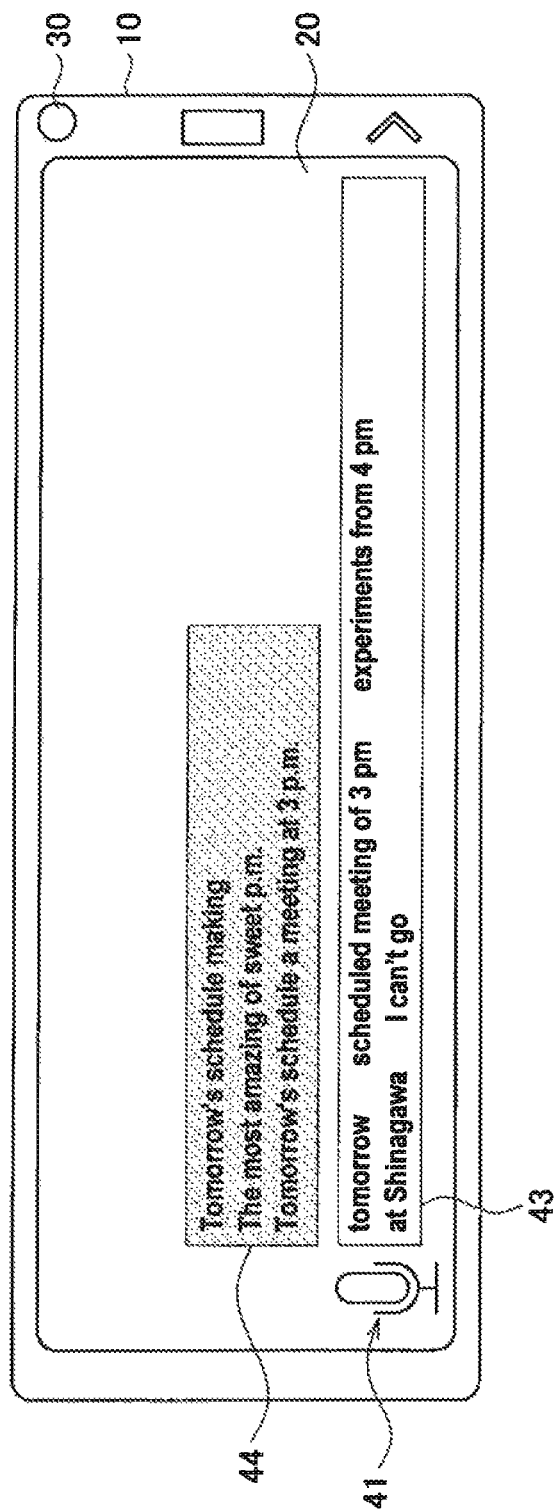
FIG. 14 is an illustration diagram showing an example of the state where text candidates are displayed along with the text content of the first input during the voice input in English.

When a first input is performed, as shown in FIG. 13, a text content obtained as the result of the voice recognition processing of the first input is displayed in the first text display region 43. At this time, along with the text content of the first text display region 43, an intermediate result of voice recognition processing may be caused to be displayed in the additional information display region 44, or text candidates etc. may be caused to be displayed in the additional information display region 44 as shown in FIG. 14.

Figure 15:
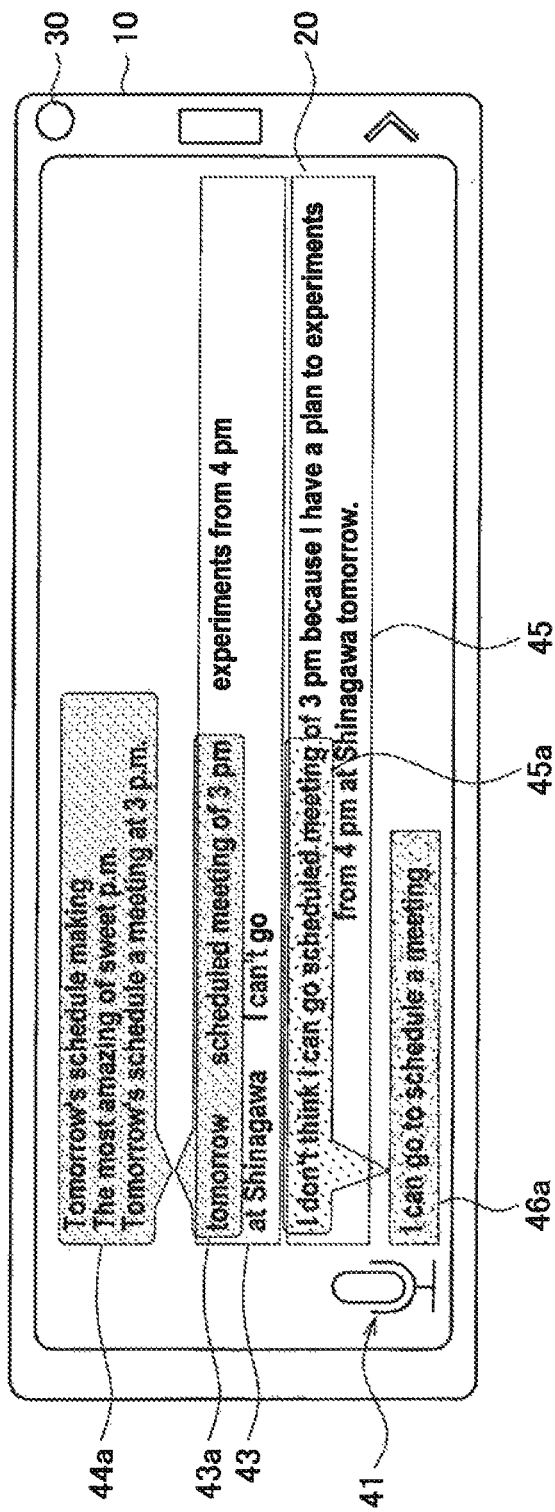
FIG. 15 is an illustration diagram showing an example of the state where the text content of a second input is displayed in the second text display region and text candidates are displayed during a voice input in English.

When a second input is performed based on the viewing of the text content of the first input, as shown in FIG. 15, a text content obtained as the result of the voice recognition processing of the second input is displayed in the second text display region 45. At this time, along with the text content of the second text display region 45, an intermediate result of voice recognition processing, text candidates, etc. may be caused to be displayed in the second additional information display region 46a.

4.3. Examples of the Display of a Text Content in a Glass-Wearable Terminal

Although examples of the text display in an information processing terminal 10 such as a smartphone or a tablet terminal are described in the above description, the result of the voice recognition processing of an inputted voice may be similarly displayed also in other devices. For example, in a glass-wearable terminal 50 like that shown in FIG. 16, a microphone icon and the result of the voice recognition processing of an inputted voice may be displayed on a display unit 52 like in the layout shown in FIG. 1. In this case, the microphone icon may be operated by, as described above, an operation input by a line of vision, an operating part of the glass-wearable terminal 50, a movement of the head, etc.

Also in this case, on receiving an inputted voice, the information processing device 100 acquires a text content as the result of voice recognition processing, and causes the display unit 52 to display the text content. Thereby, the user can be led to a state where it is easy to perform voice input, and the voice input can be caused to be finally settled as the input text.

5. Examples of the Hardware Configuration

The processing by the information processing device 100 according to the embodiment described above may be caused to be executed by hardware, or may be caused to be executed by software. In this case, the information processing device 100 may be configured in the manner shown in FIG. 17. An example of the hardware configuration of the information processing device 100 will now be described based on FIG. 17.

Figure 17:
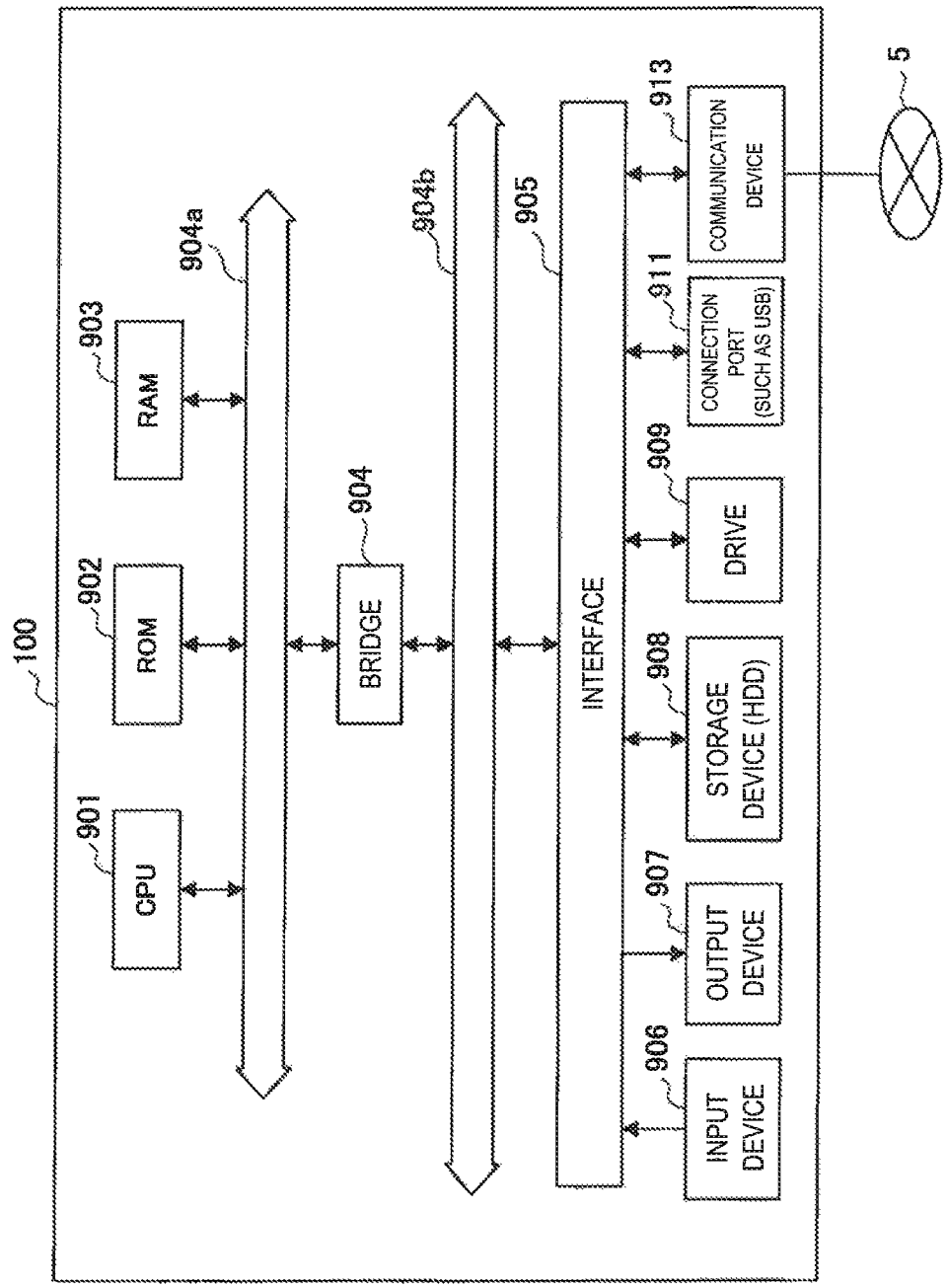
FIG. 17 is a hardware configuration diagram showing an example of the hardware configuration of the information processing device according to the embodiment.

The information processing device 100 may be obtained using a processing device such as a computer as described above. The information processing device 100 includes, as shown in FIG. 17, a central processing unit (CPU) 901, a read-only memory (ROM) 902, a random-access memory (RAM) 903, and a host bus 904a. The information processing device 100 further includes a bridge 904, an external bus 904b, an interface 905, an input device 906, an output device 907, a storage device (HDD) 908, a drive 909, a connection port 911, and a communication device 913.

The CPU 901 functions as an arithmetic processing unit and a control device, and controls the overall operation in the information processing device 100 in accordance with various programs. The CPU 901 may be also a microprocessor. The ROM 902 stores programs, processing parameters, etc. that the CPU 901 uses. The RAM 903 temporarily stores programs used in the execution of the CPU 901, parameters that vary as appropriate in the execution, etc. These units are connected to each other by the host bus 904a formed of a CPU bus or the like.

The host bus 904a is connected to the external bus 904b such as a peripheral component interconnect/interface (PCI) bus via the bridge 904. It is not necessarily needed to configure the host bus 904a, the bridge 904, and the external bus 904b separately, and the functions of these may be mounted on one bus.

The input device 906 is composed of an input means for the user's input of information, such as a mouse, a keyboard, a touch panel, a button, a microphone, a switch, and a lever, an input control circuit that generates an input signal on the basis of an input by the user and outputs the input signal to the CPU 901, etc. The output device 907 includes, for example, a display device such as a liquid crystal display (LCD) device, an organic light emitting diode (OLED) device, and a lamp, and a voice output device such as a loudspeaker.

The storage device 908 is an example of the memory unit of the information processing device 100, and is a device for data storage. The storage device 908 may include a storage medium, a recording device that records data in the storage medium, a reading device that reads data from the storage medium, a deletion device that deletes data recorded in the storage medium, etc. The storage device 908 is formed of for example, a hard disk drive (HDD). The storage device 908 drives the hard disk to store programs and various data that the CPU 901 executes.

The drive 909 is a reader/writer for a storage medium, and is installed in or externally attached to the information processing device 100. The drive 909 reads information recorded in an installed removable recording medium such as a magnetic disk, an optical disk, a magneto-optical disk, or a semiconductor memory, and outputs the information to the RAM 903.

The connection port 911 is an interface that is to be connected to an external device, and is a connection port to an external device to which data can be transmitted through, for example, a universal serial bus (USB) or the like. The communication device 913 is, for example, a communication interface formed of a communication device or the like for connection to a communication network 5. The communication device 913 may be a communication device adapted for a wireless local area network (LAN), a communication device adapted for a wireless USB, or a wired communication device that performs communication through wires.

6. Conclusions

Hereinabove, the configuration and function of the information processing device 100 according to the embodiment are described. The information processing device 100 causes the analysis result of a voice input to be text-displayed so that the analysis result can be utilized in the next voice input, and thereby leads the user to a state of being able to utter with a voice that is easy to voice-recognize. Since the user can utter while viewing a text that is helpful to voice input, the user can speak while organizing the content intended to be inputted at once. Furthermore, a state in which the voice recognition is likely to provide an expected result can be brought about, and the numbers of hesitations and unnecessary words can be reduced in the inputted voice. As a result, a voice input with few errors can be brought out.

Furthermore, the result of voice recognition processing is text-displayed and is fed back to the user, and thereby the peculiarity of the voice recognition function can be grasped prior to the clean copy input; thus, a voice input that does not result in an unintended recognition result can be brought out, such as a voice input in which the number of assimilated sounds such as small "tsu" in Japanese is reduced. By the user's viewing of an unexpected voice recognition result, the failure conditions in the utterance environment can be grasped in advance, and a voice input that does not fail can be brought out, such as a voice input in which the user is made to speak in a loud voice in a noisy environment. Furthermore, there is also an effect in which the error conditions of voice recognition themselves can be presented to the user.

Furthermore, parts that coincide with a rough input may be shown by highlighting or the like in the clean copy input, and thereby the user can quickly check whether the composition is the composition the user has intended to input or not.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, in the embodiment described above, a text content obtained by receiving and analyzing a voice input is caused to be displayed, the text content of a voice input received in a state where the text content mentioned above is kept displayed is caused to be displayed, and a text content that coincides with the content the user intends is settled as the final input text. The settled input text may be other than the text content of the latest voice input, for example, and a design in which the text content of the voice input before last can be settled as the final input text, for example, is possible. Furthermore, the information processing device 130 may cause a memory (not illustrated) to record a text content as the result of analysis of a voice in accordance with the operation by the user or a prescribed condition. The text content recorded in the memory may be read through various applications to be utilized as appropriate, and can thereby be utilized as draft information for the input text, for example.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)

An information processing device including:
a processing unit configured to acquire a text content as an analysis result of an inputted voice and cause a display unit to display the text content,
wherein the processing unit
acquires a first text content obtained by receiving and analyzing a first voice input and causes the display unit to display the first text content,
acquires a second text content as an analysis result of a second voice input received in a state where the first text content is displayed and causes the display unit to display the second text content, and
settles the second text content as an input text in accordance with an operation by a user or a prescribed condition.

(2)

The information processing device according to (1), wherein the processing unit causes the display unit to display an intermediate analysis of the first text content along with the first text content.

(3)

The information processing device according to (1), wherein the processing unit causes the display unit to display an input candidate predicted from the first text content along with the first text content.

(4)

The information processing device according to (3), wherein the processing unit causes the display unit to display information indicating a corresponding relationship between the first text content and the input candidate predicted from the first text content.

(5)

The information processing device according to (3) or (4), wherein the processing causes the first text content and the input candidate displayed on the display unit to be exchanged and displayed on the basis of an operation input by the user.

(6)

The information processing device according to any one of (1) to (5), wherein the processing unit causes the first text content to be displayed with highlighting in accordance with an accuracy of voice recognition.

(7)

The information processing device according to any one of (1) to (6), wherein the processing unit alters a unit of display text of the first text content in accordance with a unit of text of the inputted first voice input.

(8)

The information processing device according to any one of (1) to (7), wherein, when the second text content has not been settled as the input text, the processing unit acquires a text content as an analysis result of a voice input and causes the display unit to display the text content repeatedly until an input text is settled in accordance with the operation by the user or the prescribed condition.

(9)

An information processing method including:

acquiring a first text content as an analysis result of a first voice input and causing a display unit to display the first text content;

acquiring a second text content as an analysis result of a second voice input received in a state where the first text content is displayed and causing the display unit to display the second text content; and settling the second text content as an input text in accordance with an operation by a user or a prescribed condition.

(10)

A program for causing a computer to execute processing including:

acquiring a first text content as an analysis result of a first voice input and causing a display unit to display the first text content;

acquiring a second text content as an analysis result of a second voice input received in a state where the first text content is displayed and causing the display unit to display the second text content; and settling the second text content as an input text in accordance with an operation by a user or a prescribed condition.

REFERENCE SIGNS LIST 100 information processing device
110 operation input unit
120 voice input unit
130 information processing unit
140 display processing unit
150 display unit
200 voice processing server
210 voice recognition processing unit

The invention claimed is:

1. An information processing device comprising:
a processing unit configured to acquire a text content as an analysis result of an inputted voice and cause a display unit to display the text content,
wherein the processing unit
acquires a first text content obtained by receiving and analyzing a first voice input as a draft input for inputting a composition and causes the display unit to display the first text content with at least one input candidate predicted from the first text content,
acquires a second text content as an analysis result of a second voice input as a clean copy input received in a state where the first text content is displayed and causes the display unit to display the second text content with at least one input candidate predicted from the second text content, and
settles the second text content as an input text in accordance with an operation by a user or a prescribed condition.

2. The information processing device according to claim 1, wherein the processing unit causes the display unit to display at least one input candidate from first or second text content as an intermediate analysis result of the first or second text content along with the first text content.

3. The information processing device according to claim 1, wherein the processing unit causes the display unit to display information indicating a corresponding relationship between the first or second text content and the at least one input candidate predicted from the first or second text content.

4. The information processing device according to claim 3, wherein the processing unit causes the first or second text content and the input candidate displayed on the display unit to be exchanged and displayed on the basis of an operation input by the user.

5. The information processing device according to claim 1, wherein the processing unit causes the first text content to be displayed with highlighting in accordance with an accuracy of voice recognition.

6. The information processing device according to claim 1, wherein the processing unit alters a unit of display text of the first text content in accordance with a unit of text of the inputted first voice input.

7. The information processing device according to claim 1, wherein, when the second text content has not been settled as the input text, the processing unit acquires a third text content as an analysis result of a third voice input and causes the display unit to display the third text content repeatedly until the input text is settled in accordance with the operation by the user or the prescribed condition.

8. The information processing device according to claim 1, wherein the first text content is displayed in a first text display region and the second text content is displayed in a second text display region.

9. The information processing device according to claim 8, wherein the at least one input candidate predicted from the first text content is displayed in a first additional information display region and the at least one input candidate predicted from the second text content is displayed in a second additional information display region.

10. An information processing method comprising:
acquiring a first text content as an analysis result of a first voice input as a draft input for inputting a composition and causing a display unit to display the first text content with at least one input candidate predicted from the first text content;
acquiring a second text content as an analysis result of a second voice input as a clean copy input received in a state where the first text content is displayed and causing the display unit to display the second text content with at least one input candidate predicted from the second text content; and
settling the second text content as an input text in accordance with an operation by a user or a prescribed condition.

11. A non-transitory computer-readable medium having embodied thereon a program, which when executed by for causing a computer causes the computer to execute a method, the method comprising:
acquiring a first text content as an analysis result of a first voice input as a draft input for inputting a composition and causing a display unit to display the first text content with at least one input candidate predicted from the first text content;
acquiring a second text content as an analysis result of a second voice input as a clean copy input received in a state where the first text content is displayed and causing the display unit to display the second text content with at least one input candidate predicted from the second text content; and settling the second text content as an input text in accordance with an operation by a user or a prescribed condition.

\* \* \* \* \*